US009734053B2

(12) United States Patent
Frazier et al.

(10) Patent No.: US 9,734,053 B2
(45) Date of Patent: *Aug. 15, 2017

(54) GARBAGE COLLECTION HANDLER TO UPDATE OBJECT POINTERS

(71) Applicant: INTERNATIONAL BUSINESS MACHINES CORPORATION, Armonk, NY (US)

(72) Inventors: Giles R. Frazier, Austin, TX (US); Michael K. Gschwind, Chappaqua, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 106 days.

This patent is subject to a terminal disclaimer.

(21) Appl. No.: 14/755,679

(22) Filed: Jun. 30, 2015

(65) Prior Publication Data

US 2017/0004073 A1 Jan. 5, 2017

(51) Int. Cl.
G06F 12/02 (2006.01)
G06F 12/10 (2016.01)

(52) U.S. Cl.
CPC ...... G06F 12/0269 (2013.01); G06F 12/0253 (2013.01); G06F 12/10 (2013.01); *G06F 2212/1044* (2013.01)

(58) Field of Classification Search
CPC .............................. G06F 12/0253; G06F 12/10
See application file for complete search history.

(56) References Cited

U.S. PATENT DOCUMENTS

| 5,088,036 | A | 2/1992 | Ellis et al. |
| 5,560,003 | A | 9/1996 | Nilsen |
| 5,920,876 | A | 7/1999 | Ungar et al. |
| 6,098,089 | A | 8/2000 | O'Connor et al. |
| 6,584,478 | B1 * | 6/2003 | Spertus ................ G06F 9/5016 |
| 6,874,074 | B1 * | 3/2005 | Burton ................ G06F 12/0269 707/999.202 |
| 7,287,049 | B1 | 10/2007 | Printezis et al. |

(Continued)

FOREIGN PATENT DOCUMENTS

EP 0990207 B1 8/2004

OTHER PUBLICATIONS

"Power ISA™ Version 2.07B", International Business Machines Corporation, Apr. 9, 2015, pp. 1-1526.

(Continued)

*Primary Examiner* — Ryan Bertram
(74) *Attorney, Agent, or Firm* — William A. Kinnaman, Jr., Esq.; Blanche E. Schiller, Esq.; Heslin Rothenberg Farley & Mesiti P.C.

(57) ABSTRACT

Garbage collection processing is facilitated. Based on execution of a load instruction and determining that an object pointer to be loaded indicates a location within a selected portion of memory undergoing garbage collection, processing control is obtained by a handler executing within a processor of the computing environment. The handler obtains an address of the object pointer from a pre-defined location, reads the object pointer, and determines whether the object pointer is to be modified. If the object pointer is to be modified, the handler modifies the object pointer. The handler then stores the modified object pointer in a selected location.

20 Claims, 8 Drawing Sheets

(56) References Cited

U.S. PATENT DOCUMENTS

| | | | |
|---|---|---|---|
| 7,313,566 | B1 | 12/2007 | Printezis et al. |
| 7,647,458 | B1 | 1/2010 | Click, Jr. et al. |
| 8,327,109 | B2 | 12/2012 | Caspole |
| 8,473,722 | B2 | 6/2013 | Meyer |
| 8,601,036 | B2 | 12/2013 | Nalla et al. |
| 2005/0235120 | A1* | 10/2005 | Dussud ............... G06F 12/0276 711/159 |
| 2006/0248130 | A1 | 11/2006 | Grarup et al. |
| 2007/0255909 | A1* | 11/2007 | Gschwind ........... G06F 12/0269 711/147 |
| 2009/0024679 | A1* | 1/2009 | Amundsen .......... G06F 12/0253 |
| 2009/0063595 | A1 | 3/2009 | Stoodley |
| 2011/0145304 | A1* | 6/2011 | Gray .................... G06F 9/3004 707/820 |
| 2014/0059093 | A1 | 2/2014 | Sekiguchi |

OTHER PUBLICATIONS

"z/Architecture Principles of Operation", IBM® Publication No. SA22-7832-10, Eleventh Edition, Mar. 2015, pp. 1-1732.

IBM, "Declarative 'Meta-Stack' Garbage Collection in the C Programming Language," IP.com No. 000015532, Jun. 2003, pp. 1-4.

Software Patent Institute, et al., "Performance Evaluation of High-Level Language Systems," IP.com No. 000148142,Nov. 1977, pp. 1-45.

IBM, "Heuristic Garbage Collection," IP.com No. 000013453, Jun. 2003, pp. 1-3.

Software Patent Institute et al., "Compiling Parallel Programs by Optimizing Performance," IP.com No. 000161304, Jun. 1988, pp. 1-36.

Veldema, Ronald et al., "Object Combining: A New Aggressive Optimization for Object Intensive Programs," JGI '02 Proceedings of the 2002 joint ACM-ISCOPE conference on Java Grande, Nov. 2002, pp. 1-10.

Frazier et al., "Garbage Collection Absent Use of Special Instructions," U.S. Appl. No. 14/755,748, filed Jun. 30, 2015, pp. 1-50.

Frazier et al., "Garbage Collection Handler to Update Object Pointers," U.S. Appl. No. 14/941,555, filed Nov. 14, 2015, pp. 1-45.

Frazier et al., "Garbage Collection Absent Use of Special Instructions," U.S. Appl. No. 14/941,558, filed Nov. 14, 2015, pp. 1-50.

List of IBM Patents or Patent Applications Treated As Related, Mar. 11, 2016, 2 pages.

International Search Report and Written Opinion for PCT/IB2016/053675 dated Oct. 11, 2016, pp. 1-11.

Combined Search Report and Examination Report for GB1610881.3 dated Nov. 23, 2016, pp. 1-7.

IBM Technical Disclosure Bulletin, "Hardware Segmentation Support for Real-Time Garbage Collection," vol. 31, No. 7, Dec. 1988, pp. 245-247.

Office Action for U.S. Appl. No. 14/941,555 dated Dec. 15, 2016, pp. 1-9.

Office Action for U.S. Appl. No. 14/755,748 dated Feb. 15, 2017, pp. 1-34.

Office Action for U.S. Appl. No. 14/941,558 dated Feb. 15, 2017, pp. 1-29.

* cited by examiner

GARBAGE COLLECTION HANDLER TO UPDATE OBJECT POINTERS

BACKGROUND

One or more aspects relate, in general, to processing within a computing environment, and in particular, to garbage collection processing within the computing environment.

Garbage collection is an automatic memory management process that identifies objects in memory that are no longer being referenced and frees those objects. As memory objects of varying sizes are allocated and later freed, the memory in which they are stored becomes increasingly fragmented. Eventually, very few large free areas of memory exist, and it becomes difficult to store additional objects without increasing the memory size. When this occurs, a process within garbage collection, referred to as compaction, is employed in order to consolidate the allocated objects into one large area, leaving another large area of free space available for new objects. During consolidation, the memory objects that are still being referenced are moved from one area of memory to another area of memory.

Conventionally, when garbage collection is performed on an object storage area, applications using the object storage area are required to pause execution. One reason for this is to determine whether the pointers to the objects used by the applications to access the objects are still valid. These pauses, occasionally several seconds long, prevent the applications from being used for time-sensitive tasks, such as transaction processing, real-time games, or mechanical control. Thus, a need exists for an optimized garbage collection process.

SUMMARY

In accordance with one or more aspects, an optimized garbage collection process is provided that enables applications to continue executing during the garbage collection process (without being paused due to garbage collection) when those applications are not accessing objects in an area of memory undergoing garbage collection, and enables applications accessing objects in an area of memory undergoing garbage collection to immediately resume processing after a very brief delay. This is enabled by providing an efficient mechanism to recognize when a pointer to the object storage area that is being collected is accessed, to obtain the address of the pointer, and to modify the pointer. This advantageously improves performance within a computing environment, including application performance and/or processor performance.

In one embodiment, shortcomings of the prior art are overcome and additional advantages are provided through the provision of a computer program product for facilitating garbage collection within a computing environment. The computer program product comprises a storage medium readable by a processing circuit and storing instructions for execution by the processing circuit for performing a method. The method includes, for instance, obtaining processing control by a handler executing within a processor of the computing environment, the obtaining processing control being based on execution of a load instruction and a determination that an object pointer to be loaded indicates a location within a selected portion of memory undergoing garbage collection. Based on obtaining processing control by the handler, the handler obtains from a pre-defined location an address of the object pointer, the address specifying a location of the object pointer. The handler, based on obtaining the address of the object pointer, reads the object pointer and determines whether the object pointer is to be modified. The object pointer indicates a location of an object pointed to by the object pointer. Based on determining the object pointer is to be modified, the object pointer is modified to provide a modified object pointer. The modified object pointer, based on modifying the object pointer, is then stored in a selected location.

Advantageously, this allows applications using objects in an area of memory not undergoing garbage collection to continue processing during garbage collection without interruption, allows applications using objects in an area of memory undergoing garbage collection to continue processing after a very short unnoticeable delay, and does not require the handler to access the load instruction and calculate the pointer address from the contents of the registers used by the load instruction when an application uses an object in the area of memory undergoing garbage collection, thus improving performance.

In one embodiment, the obtaining processing control is via an interrupt issued by processor hardware. The interrupt is issued based on execution of the load instruction and the determination that the object pointer to be loaded indicates the location within the selected portion of memory undergoing garbage collection. In one particular example, the interrupt is a lightweight interrupt (i.e., not involving the operating system) that gives control directly to an application-level handler. Advantageously, one or more of these aspects enable immediate processing by the handler, and enables the application that accessed the pointer to continue processing immediately after the interrupt is processed without incurring the delay of a supervisor-level interrupt handler.

In one further embodiment, the selected portion of memory undergoing garbage collection is part of an object area that also includes one or more other objects not undergoing garbage collection, and advantageously, one or more applications accessing the object area not undergoing garbage collection continue process during garbage collection. For instance, they continue executing without interruption. Further, in one embodiment, the application that accessed the object pointer that indicates an object in the selected portion of memory undergoing garbage collection immediately resumes processing after a very brief delay during the time the handler (e.g., lightweight, application-level handler) processes the pointer. This enables applications to be used for time-sensitive processing because no application is delayed for a time period that is significant enough to be noticeable.

In one embodiment, the object pointer (e.g., the address of the object pointed to by the object pointer) is determined from execution of the load instruction (e.g., a load monitored doubleword indexed instruction), and it is compared with information relating to the selected portion of memory to determine that the object pointer indicates a location within the selected portion of memory. Based on determining the object pointer indicates the location within the selected portion of memory, the address of the object pointer (i.e., the address specifying a location of the object pointer) is stored in the pre-defined location.

In one aspect, the obtaining the address of the object pointer from the pre-defined location includes reading the address from the pre-defined location, based on obtaining processing control. This advantageously eliminates the need for the handler to calculate the address; thus, saving instructions and time, and improving performance.

In embodiments, the pre-defined location includes a location in memory or a register. Further, in embodiments, the selected portion of memory is indicated by a register or a location within memory, and in one aspect, the register includes a base address of the selected portion of memory and a size of the selected portion of memory.

Yet further, in one example, the selected location in which the modified object pointer is stored is a location specified by the pre-defined location or a location specified by the load instruction.

As one example, the load instruction includes one or more operation code fields to specify a load operation, a result field to be used to obtain the object pointer, and one or more other fields to be used in the load operation.

Computer-implemented methods and systems relating to one or more aspects, as well as other computer program products, may also be described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

In accordance with one or more aspects, a capability is provided for an optimized garbage collection process that advantageously improves application performance, improves performance of the processor executing the application, and/or improves performance of the computing environment in which the processor executes.

The optimized garbage collection process allows applications (also referred to as programs) that are accessing objects in an area of memory not undergoing garbage collection to continue processing during garbage collection without interruption, allows applications accessing objects in an area of memory being garbage collected to continue processing after a very short unnoticeable delay, and further improves the handling of the object pointers (also referred to as pointers). In one embodiment, an instruction, referred to as a load monitored doubleword indexed (ldmx) instruction, is provided and used whenever an application accesses a pointer to an object in memory. When such an instruction accesses a pointer that indicates an object that lies within a given address range, the processor causes an asynchronous branch (referred to as an Event-Based Branch (EBB)) to a pointer update handler (also referred to as a garbage collection handler, an EBB handler, or handler). This enables the pointer update handler to update the pointer (e.g., the address of the object) if the object pointed to has been moved during an ongoing garbage collection process or is moved by the handler. In order to update the pointer, the handler needs to know its address. In one embodiment of the instruction, the address of the pointer is calculated internally by the hardware during execution of the ldmx instruction, and is not available to the pointer update handler. Thus, in order to determine the address of the pointer, the pointer update handler examines the ldmx instruction to determine the source registers, reads the source registers, and calculates the address of the pointer based on contents of the source registers.

In a further embodiment, instead of the pointer update handler calculating the pointer address as indicated above, the pointer update handler is provided or has direct access to the pointer address, in accordance with one or more aspects. This reduces the number of instructions needed to process the pointer and to return control to the application, thereby improving performance.

Figure 1:
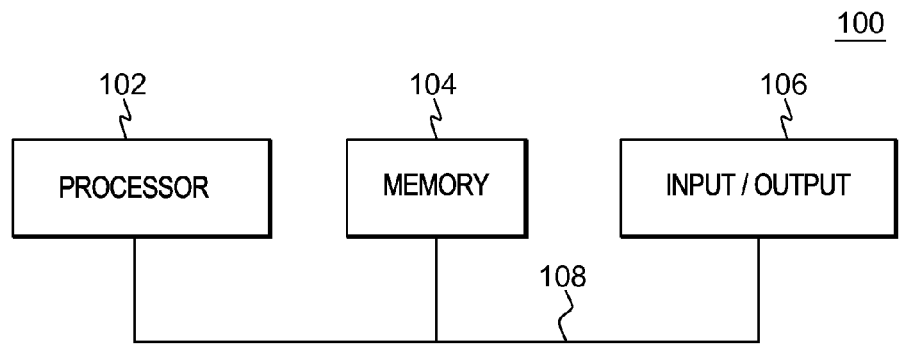
FIG. 1 depicts one example of a computing environment to incorporate and use one or more aspects.

One embodiment of a computing environment to incorporate and use one or more aspects is described with reference to FIG. 1. A computing environment 100 includes, for instance, a processor 102 (e.g., a central processing unit), a memory 104 (e.g., main memory), and one or more input/output (I/O) devices and/or interfaces 106 coupled to one another via, for example, one or more buses 108 and/or other connections.

In one embodiment, processor 102 is based on the Power Architecture offered by International Business Machines Corporation. One embodiment of the Power Architecture is described in "Power ISA™ Version 2.07 Revision B," International Business Machines Corporation, Apr. 9, 2015, which is hereby incorporated herein by reference in its entirety. POWER ARCHITECTURE® is a registered trademark of International Business Machines Corporation, Armonk, N.Y., USA. Other names used herein may be registered trademarks, trademarks, or product names of International Business Machines Corporation or other companies.

In another example, processor 102 is based on the z/Architecture offered by International Business Machines Corporation, and is part of a server, such as the System z server, which implements the z/Architecture and is also offered by International Business Machines Corporation. One embodiment of the z/Architecture is described in an IBM® publication entitled, "z/Architecture Principles of Operation," IBM® Publication No. SA22-7832-10, Eleventh Edition, March 2015, which is hereby incorporated herein by reference in its entirety. In one example, the processor executes an operating system, such as z/OS, also offered by International Business Machines Corporation. IBM®, Z/ARCHITECTURE® and Z/OS® are registered trademarks of International Business Machines Corporation.

In yet a further embodiment, processor 102 is based on an Intel architecture offered by Intel Corporation. Intel® is a registered trademark of Intel Corporation, Santa Clara, Calif. Yet further, processor 102 may be based on other architectures. The architectures mentioned herein are merely provided as examples.

Figure 2A:
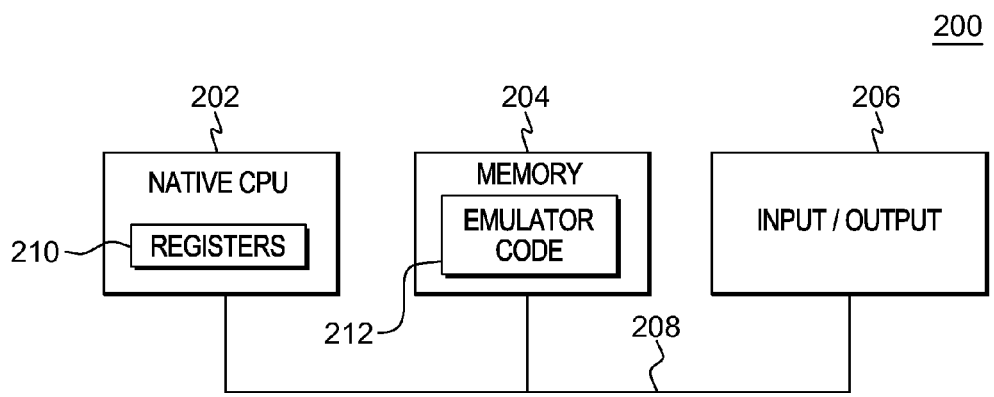
FIG. 2A depicts another example of a computing environment to incorporate and use one or more aspects.

Another embodiment of a computing environment to incorporate and use one or more aspects is described with reference to FIG. 2A. In this example, a computing environment 200 includes, for instance, a native central processing unit 202, a memory 204, and one or more input/output devices and/or interfaces 206 coupled to one another via, for example, one or more buses 208 and/or other connections. As examples, computing environment 200 may include a PowerPC processor, a zSeries server, or a pSeries server offered by International Business Machines Corporation, Armonk, N.Y.; an HP Superdome with Intel Itanium II processors offered by Hewlett Packard Co., Palo Alto, Calif.; and/or other machines based on architectures offered by International Business Machines Corporation, Hewlett Packard, Intel, Oracle, or others.

Native central processing unit 202 includes one or more native registers 210, such as one or more general purpose registers and/or one or more special purpose registers used during processing within the environment. These registers include information that represent the state of the environment at any particular point in time.

Moreover, native central processing unit 202 executes instructions and code that are stored in memory 204. In one particular example, the central processing unit executes emulator code 212 stored in memory 204. This code enables the processing environment configured in one architecture to emulate another architecture. For instance, emulator code 212 allows machines based on architectures other than the Power architecture, such as zSeries servers, pSeries servers, HP Superdome servers or others, to emulate the Power architecture and to execute software and instructions developed based on the Power architecture. In a further example, emulator code 212 allows machines based on architectures other than the z/Architecture, such as PowerPC processors, pSeries servers, HP Superdome servers or others, to emulate the z/Architecture and to execute software and instructions developed based on the z/Architecture. Other architectures may also be emulated.

Figure 2B:
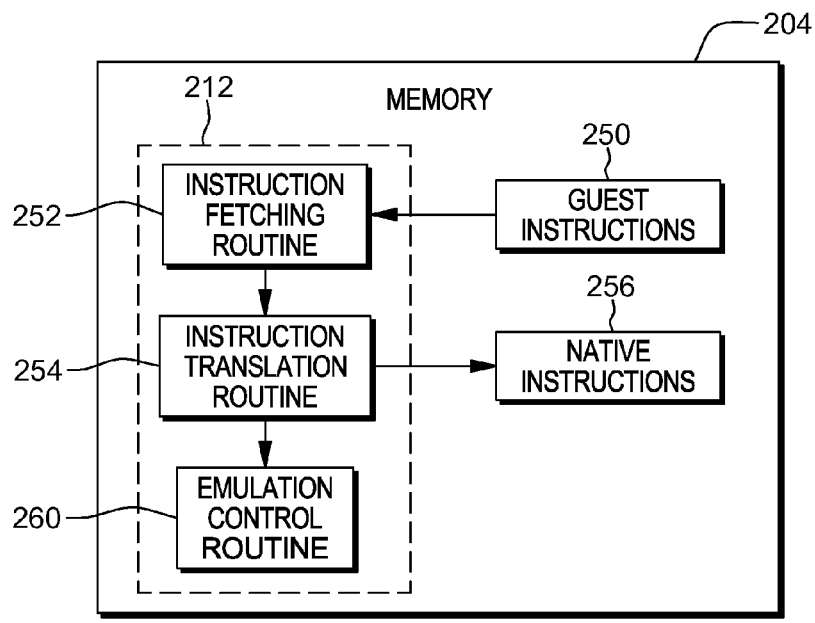
FIG. 2B depicts further details of the memory of FIG. 2A.

Further details relating to emulator code 212 are described with reference to FIG. 2B. Guest instructions 250 stored in memory 204 comprise software instructions (e.g., correlating to machine instructions) that were developed to be executed in an architecture other than that of native CPU 202. For example, guest instructions 250 may have been designed to execute on a PowerPC processor or a z/Architecture processor 102, but instead, are being emulated on native CPU 202, which may be, for example, an Intel Itanium II processor. In one example, emulator code 212 includes an instruction fetching routine 252 to obtain one or more guest instructions 250 from memory 204, and to optionally provide local buffering for the instructions obtained. It also includes an instruction translation routine 254 to determine the type of guest instruction that has been obtained and to translate the guest instruction into one or more corresponding native instructions 256. This translation includes, for instance, identifying the function to be performed by the guest instruction and choosing the native instruction(s) to perform that function.

Further, emulator code 212 includes an emulation control routine 260 to cause the native instructions to be executed. Emulation control routine 260 may cause native CPU 202 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 256 may include loading data into a register from memory 204; storing data back to memory from a register; or performing some type of arithmetic or logic operation, as determined by the translation routine.

Each routine is, for instance, implemented in software, which is stored in memory and executed by native central processing unit 202. In other examples, one or more of the routines or operations are implemented in firmware, hardware, software or some combination thereof. The registers of the emulated processor may be emulated using registers 210 of the native CPU or by using locations in memory 204. In embodiments, guest instructions 250, native instructions 256 and emulator code 212 may reside in the same memory or may be disbursed among different memory devices.

As used herein, firmware includes, e.g., the microcode, millicode and/or macrocode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

In one example, a guest instruction 250 that is obtained, translated and executed is an instruction described herein. The instruction, which is of one architecture (e.g., the Power architecture or z/Architecture) is fetched from memory, translated and represented as a sequence of native instructions 256 of another architecture (e.g., the z/Architecture, Power architecture, Intel architecture, etc.). These native instructions are then executed.

Figure 3:
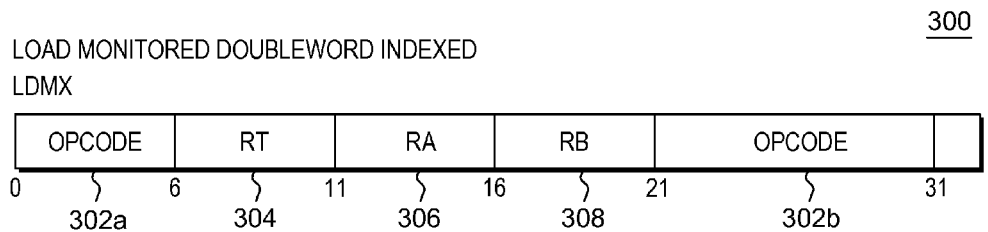
FIG. 3 depicts one example of a load monitored doubleword indexed instruction, in accordance with one or more aspects.

One instruction used in accordance with one or more aspects is the load monitored doubleword indexed instruction used to load object pointers. One particular implementation of the load monitored doubleword indexed instruction in the Power Architecture is described with reference to FIG. 3. In one example, a load monitored doubleword indexed (ldmx) instruction 300 includes operation code (opcode) fields 302a (e.g., bits 0-5), 302b (e.g., bits 21-30) indicating a load operation; a result field (RT) 304 (e.g., bits 6-10) used to indicate a register to store a result of the load operation; a first register field (RA) 306 (e.g., bits 11-15) used to specify a first register to be used by the load operation; and a second register field (RB) 308 (e.g., bits 16-20) used to specify a second register to be used by the load operation. Each of the fields 304-308, in one example, is separate and independent from one another; however, in other embodiments, more than one field may be combined. Further information on the use of the fields is described below.

In operation of the ldmx instruction, a check is made as to whether the data to be loaded (e.g., the object pointer) points to an object located in a selected portion of memory, referred to herein as a load monitored region. If the data to be loaded does not point to an object located in the selected portion of memory, then a conventional load is performed. For instance, in one example, the load is performed as if a load doubleword indexed instruction (e.g., in the Power Architecture) is being executed.

In one embodiment, the load doubleword indexed (ldx) instruction has the same format as the load monitored doubleword indexed instruction, except the opcode is different. In operation of the ldx instruction: Let an effective address (EA) be the sum (RA|0)+(RB). The doubleword in storage addressed by EA is loaded into RT.

One example of pseudo-code for the ldx instruction is as follows:

```
If RA=0 then b ← 0
else        b ← (RA)
EA ← b + (RB)
RT ← MEM(EA, 8)
``` wherein EA is an address of the object pointer, and MEM(EA, 8) is the object pointer.

Continuing with the ldmx instruction, if, however, the data to be loaded points to an object located in the selected portion of memory undergoing garbage collection, then processing is interrupted causing an Event Based Branch to an update pointer handler that performs one or more tasks related to garbage collection, including updating the pointer, if needed, as described herein further below.

One example of pseudo-code for the ldmx instruction is as follows:

```
If RA=0 then b ← 0
else        b ← (RA)
EA ← b + (RB)
loaded_ea ← MEM(EA, 8)
if¬((loaded_ea is in enabled section of load-monitored
region) & BESCR_{GELME} =0b11)
RT ← loaded_ea
``` wherein loaded_ea is the object pointer; EA is an address of the object pointer; BESCR refers to branch event status-control register; GE refers to general enable; and LME=load monitored enabled.

Although, in the examples herein, the instruction format is for the Power Architecture, similar formats may be used for other architectures.

Further, in other embodiments, a load doubleword monitored (ldm) instruction may be used that behaves like ldmx except that the EA accessed would be calculated like a load doubleword (ld) instruction using RA and DS fields instead of operands RA and RB as with ldx. With the ld instruction, let an effective address (EA) be the sum (RA|0)+(DS||0b00). The doubleword in storage addressed by EA is loaded into RT.

One example of pseudo-code for the ld instruction is as follows:

```
If RA=0 then b ← 0
else        b ← (RA)
EA ← b + EXTS(DS || 0b00)
RT ← MEM(EA, 8)
```

Figure 4:
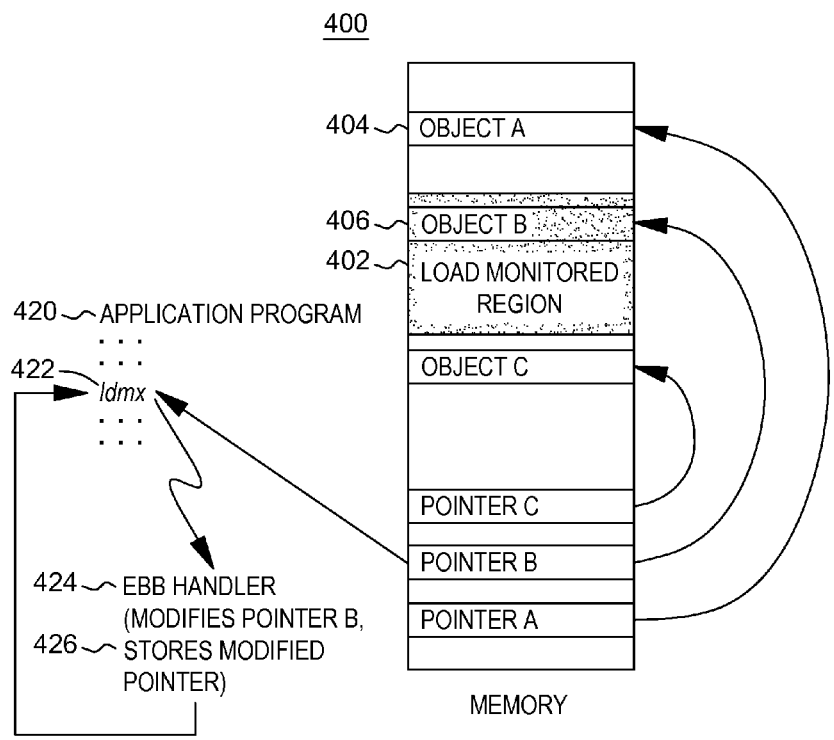
FIG. 4 depicts further details of memory for which garbage collection is to be performed, in accordance with one or more aspects.

In one embodiment, as indicated previously, the selected portion of memory undergoing garbage collection is referred to herein as the load monitored region. As shown in FIG. 4, memory 400 includes a load monitored region 402, as well as a plurality of objects 404. One of the objects, Object B 406, is in load monitored region 402 meaning that the object is in a portion of memory in which garbage collection is being performed. Therefore, the current pointer may need to be updated, if the object to which the pointer points has been moved due to the garbage collection process.

Further, as used herein, an object area includes the load monitored region and the area of memory including objects that are not undergoing garbage collection.

In this figure, it is further shown that an application program 420 executes an ldmx instruction 422, which attempts to load pointer B. Pointer B points to an object 406 in the load monitored region, and thus, an interrupt is performed giving control to EBB handler 424 (also known as the update pointer handler). Handler 424 modifies pointer B, if necessary, and stores the modified pointer in the location from which it was obtained, 426, in one example. Processing then returns to the ldmx instruction, which is re-executed.

In a further embodiment, the handler modifies the pointer, stores the modified pointer in the target register of the instruction, and processing continues at the instruction after the ldmx instruction thereby emulating the load of the pointer. In one or more aspects, the application is unaware of the EBB processing, and simply receives the pointer, as before.

Figure 5:
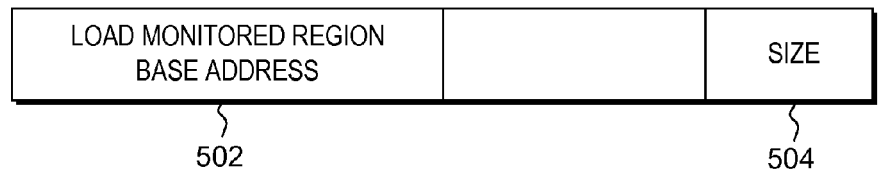
FIG. 5 depicts one example of a load monitored region register, in accordance with one or more aspects.

As indicated above, interrupt processing is performed when the data to be loaded (e.g., the pointer) points to an object that is in the load monitored region of memory. The load monitored region may be identified in alternative ways. For instance, in one implementation, its size and base address are stored in a register, such as depicted in FIG. 5. As shown, a load monitored region register (LMRR) 500 includes, for instance, a field 502 including a load monitored region base address, and a field 504 including a size of the region.

In one example, the load monitored region base address includes the high-order bits of the load monitored region. In this embodiment, it is assumed that the load monitored region is aligned on a granularity of its size. The size field is encoded such that each value corresponds to a specified size. For example, if 16 possible sizes are needed, the size field has 4 bits. Typical sizes are in the order of 10's of MBs (megabytes) to over a GB (gigabyte). The number of bits in the load monitored region base address field can be derived from the minimum size supported. For example, if the minimum size supported is 16 MB, then the load monitored region base address field is 40 bits, since 64-40=24, and 24 bits of address are sufficient to identify any 16 MB memory region aligned on a 16 MB address boundary. When the size field indicates smaller sizes, then fewer bits are required to specify the base address, and low-order bits in the load monitored region base address field are set to 0 s.

In other examples, the size and base address may be specified in a memory location, or a register used for another purpose, etc. Additionally, other information may be used to specify the address range of the load monitored region.

One embodiment of logic associated with executing the ldmx instruction is described with reference to FIG. 6. In one implementation of the Power architecture, execution of the ldmx instruction is similar to execution of a load doubleword indexed (ldx) instruction, except that it interrupts processing to give control to the update pointer handler if the data it attempts to load points to an object in the load monitored region.

Figure 6:
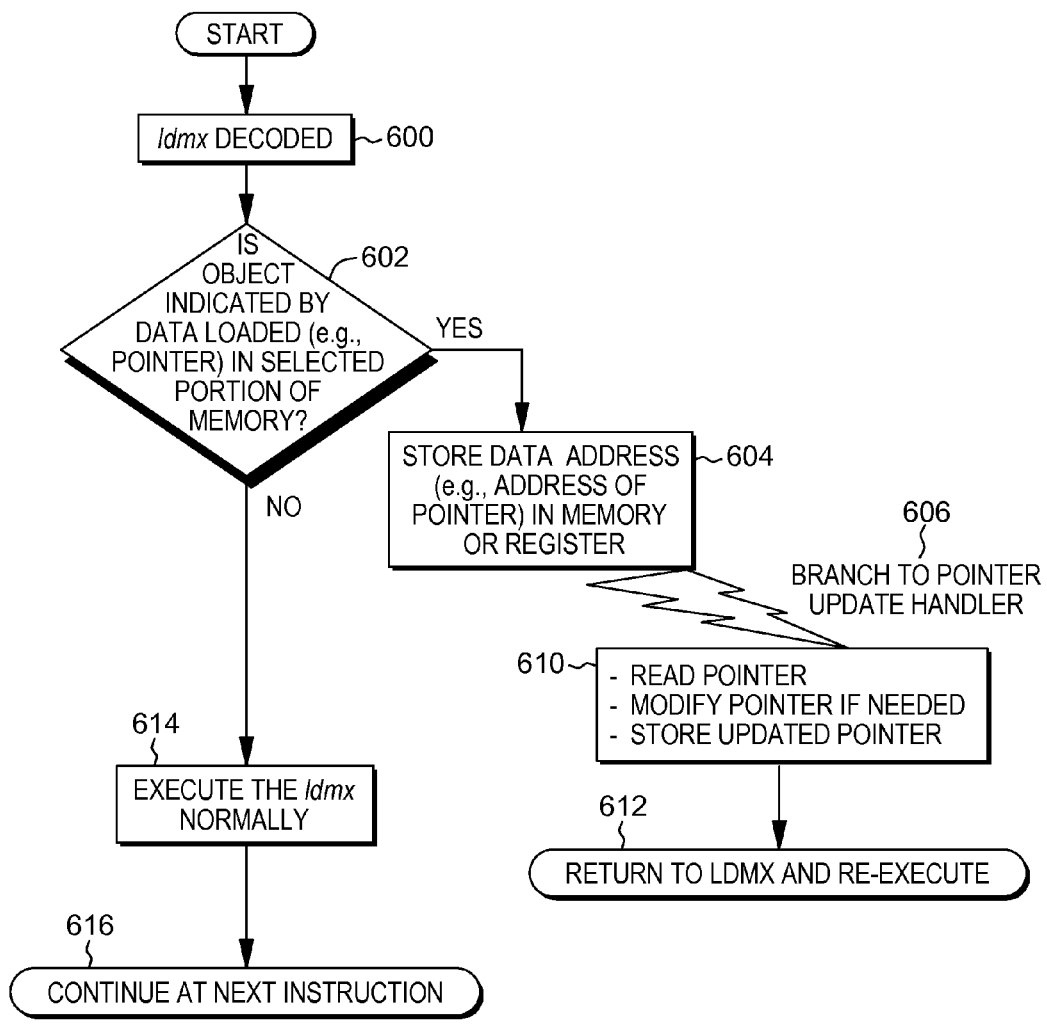
FIG. 6 depicts one embodiment of logic to perform garbage collection using the load monitored doubleword indexed instruction, in accordance with one or more aspects.

Referring to FIG. 6, in one implementation, hardware of a processor executes an application that issues the ldmx instruction, and the processor hardware decodes ldmx, STEP 600. During execution of ldmx, the processor hardware determines the memory location accessed, and compares the data (i.e., the pointer) read with the load monitored region register (or other register or memory location) that specifies the selected portion of memory undergoing garbage collection. If the pointer that was read points to a location within the load monitored region, INQUIRY 602, then the processor hardware stores the address of the pointer (also referred to as a pointer address) in a pre-defined location, such as a specified memory location or register, STEP 604. The address of the pointer is obtained, for instance, from the instruction (e.g., EA indicated by the ldmx instruction described above).

As one example, the pointer address may be stored in a specified location in storage. For instance, the storage address at which the pointer address is to be stored may be specified to immediately precede the EBB handler address stored in an Event Based Branch Handler Register (EBBHR), or at some specified offset from the address. An example offset might be to store the pointer address at a storage location that immediately precedes the start of the pointer update handler itself. If this is done, the pointer update handler simply reads that storage location in order to determine the pointer address. As a further example, the pointer address is stored in an existing register that is not needed for another purpose. For instance, the register might be part of another facility, such as a performance monitor facility. Yet further, the address may be stored in the register that is used to store the address of the pointer update handler, the EBBHR. The EBBHR could be loaded with the pointer address by the hardware immediately after the EBB occurred, and then, the pointer update handler would read that register when the pointer address was needed, and would restore it to contain the start address of the pointer update handler prior to returning control back to the application. Any other register may be used similarly, provided that the register was not needed during execution of the pointer update handler, other than to indicate the pointer address, and that register could be restored by the pointer update handler prior to returning to the application.

In addition to storing the pointer address, the hardware causes an interrupt (e.g., an Event Based Branch) to the pointer update handler, STEP 606. In one example, the handler is a lightweight, application-level handler. The pointer update handler then reads the pointer and updates it, if needed, STEP 610. For instance, the pointer update handler reads the pointer address from the pre-defined location (e.g., register or memory) in which it was stored in STEP 604; reads the pointer (e.g., the address of the object to which it points); modifies the pointer, if needed (e.g., if the object to which it points was moved during garbage collection) and performs other garbage collection tasks as needed and as time permits; and stores the pointer, if modified. As an example, the updated pointer is stored in the location from which the pointer was read (e.g., the location indicated by the pre-defined location). The handler can then return control to the application and re-execute the ldmx, STEP 612.

In a further embodiment, the modified object pointer is stored in a location specified by the ldmx instruction, and the handler returns control to the application at the instruction after the ldmx. As an example, the update handler reads the ldmx target register, and stores the modified pointer in the ldmx target register. This has the effect of emulating a load of the pointer.

Returning to INQUIRY 602, if the pointer that was read does not point to a location within the load monitored region, then the processor hardware does not cause the Event Based Branch, but instead executes the ldmx instruction without the interrupt, STEP 614. For instance, the ldmx instruction is processed as if the load doubleword indexed instruction was executed, as described above. In particular, in one example, the pointer is read from the location identified by the instruction and it is stored in the target register. Thereafter, processing continues to the next instruction, STEP 616.

As described herein, garbage collection is optimized by allowing applications to continue processing (without being paused due to garbage collection) when those applications are not accessing objects in an area of memory undergoing garbage collection. Further, garbage collection is optimized by allowing applications accessing objects in an area of memory undergoing garbage collection to immediately resume processing after a very brief delay during the time the lightweight interrupt handler processes the pointer. This is enabled by determining during the load of the pointer that the object is in the selected portion of memory undergoing garbage collection, and based thereon, causing an interrupt to occur such that the handler may directly obtain the address of the pointer to directly access the pointer. In one advantageous implementation, the pointer address is provided to the handler, and therefore, the handler does not have to calculate this address. Thereby, reducing the number of instructions needed to update the pointer, and improving computer processing.

Figure 7:
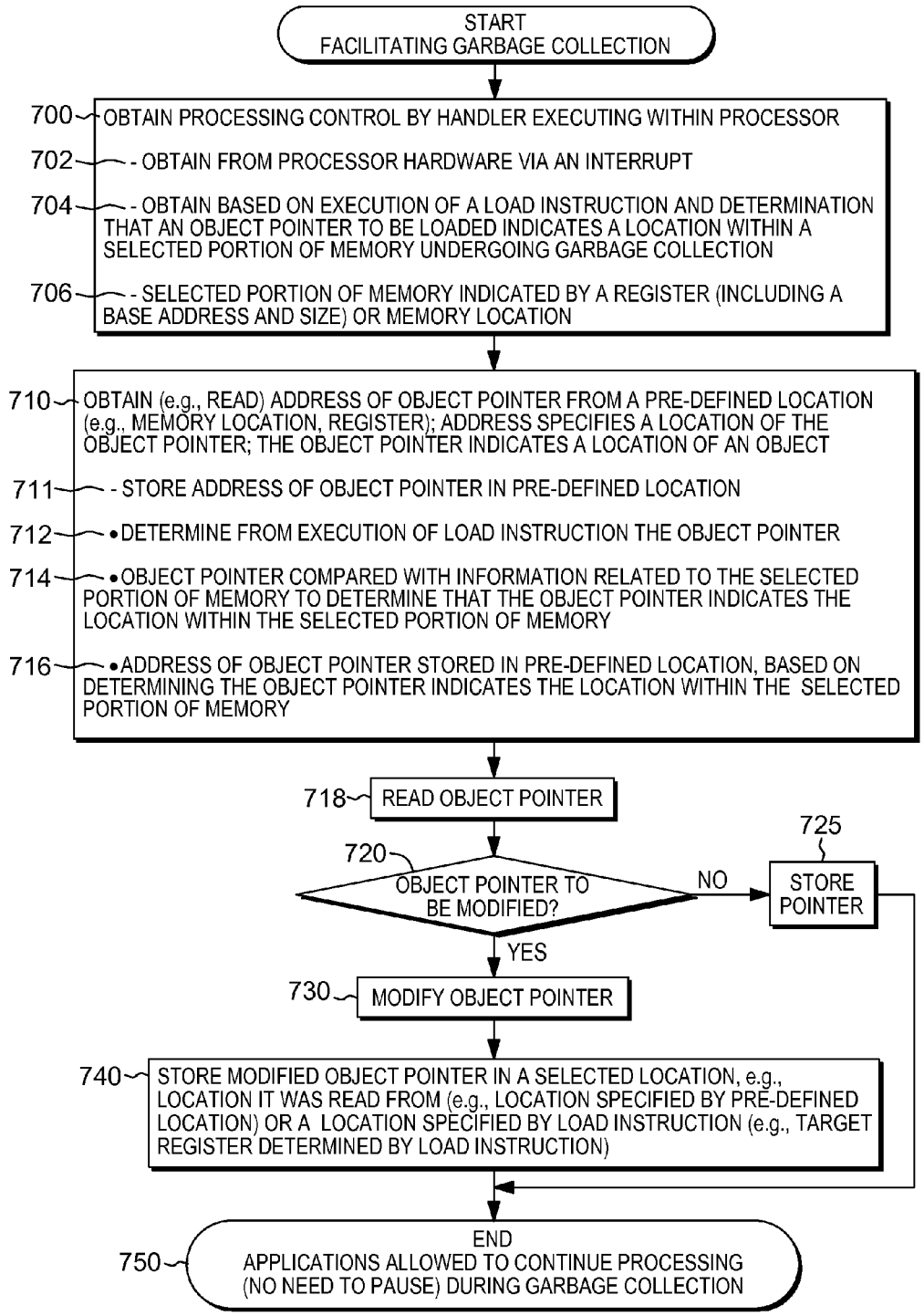
FIG. 7 depicts one embodiment of logic to perform optimized garbage collection, in accordance with one or more aspects.

One embodiment of the logic associated with facilitating garbage collection, in accordance with one or more aspects is described with reference to FIG. 7. Initially, a handler executing within a processor obtains processing control, STEP 700, via, for instance, an interrupt issued by processor hardware, STEP 702. Processing control is obtained by the handler without supervisor involvement based on execution of a load instruction (e.g., ldmx) and a determination that an object pointer to be loaded indicates a location within a selected portion of memory undergoing garbage collection, STEP 704. The selected portion of memory is indicated by a register that may include a base address and a size, or a memory location, as examples, STEP 706.

Based on obtaining processing control, the handler obtains an address of the object pointer from a pre-defined location, such as a memory location or a register, STEP 710. The address specifies a location of the object pointer. Obtaining the address from the pre-defined location advantageously eliminates the need for the handler to calculate the address. In one example, the address of the object pointer is stored in the pre-defined location by the hardware, STEP 711. For instance, the storing includes determining the object pointer from execution of the load instruction, STEP 712. The object pointer is then compared with information related to the selected portion of memory to determine whether the object pointer indicates a location within the selected portion of memory, STEP 714. If the object pointer does indicate the location within the selected portion of memory, the address of the object pointer (also obtained from execution of the instruction) is advantageously stored in the pre-defined location which is then read by the handler, STEP 716, instead of being calculated by the handler.

The handler accesses the pre-defined location to obtain the address of the object pointer and then reads the object pointer, STEP 718. The handler then determines if the object pointer is to be modified, INQUIRY 720. For instance, the handler determines whether the object pointed to by the object pointer has been moved. If the object has been moved, then the object pointer is modified, STEP 730. Thereafter, the modified object pointer is stored in a selected location, STEP 740. For instance, it is stored in the location it was read from (e.g., a location specified by the pre-defined location), and control is returned to the application at the ldmx instruction, which is re-executed. In a further embodiment, the modified object pointer is stored in a location specified by the ldmx instruction and the handler returns control to the application at the instruction after the ldmx.

Returning to INQUIRY 720, if the object pointer is not modified, it is stored, for instance, in the target register of the ldmx instruction, and the handler returns control to the application at the instruction after the ldmx, STEP 725.

Advantageously, in one or more aspects, garbage collection is facilitated by allowing applications that are not accessing objects in the selected portion of memory to continue processing (that is, no need to pause) during garbage collection, STEP 750. Also, applications that are accessing objects in the selected portion of memory are only delayed briefly.

As described herein, one or more aspects provide the address of the pointer directly to the handler without requiring the handler to calculate it. One or more aspects eliminate the decoding by the handler of the ldmx instruction to determine the source and destination addresses, the reading of the contents of the source general purpose registers, and the calculating the effective address of the pointer—again, instead, the handler reads the address and does not need to calculate it. One or more aspects advantageously enable applications requiring garbage collection to enter time-sensitive environments, such as high-speed trading, real-time mechanical control, time-sensitive games, etc. One or more aspects do not increase the footprint of the application, since no additional instructions need to be inserted into the application, and do not require any modifications to the operating system.

Advantageously, the pointer address is directly available to the pointer update handler, thereby not requiring a large number of instructions or performance of time consuming tasks to calculate the pointer address (that may or may not be modified later on). Further, this is performed while minimizing hardware usage.

In accordance with one or more aspects, upon each access to an object pointer, processing may be diverted to a real-time garbage collection handler (e.g., pointer update handler) if the pointer points to an object in a region of memory being garbage collected. The handler is then provided with the pointer address.

As described herein, garbage collection is facilitated. In one embodiment, processing control is obtained by a handler executing within a processor of the computing environment, the obtaining processing control being based on execution of a load instruction and a determination that an object pointer to be loaded indicates a location within a selected portion of memory undergoing garbage collection. Based on obtaining processing control by the handler, the handler obtains from a pre-defined location an address of the object pointer, the address specifying a location of the object pointer. The handler, based on obtaining the address of the object pointer, reads the object pointer and determines whether the object pointer is to be modified. The object pointer indicates a location of an object pointed to by the object pointer. Based on determining the object pointer is to be modified, the object pointer is modified to provide a modified object pointer. The modified object pointer, based on modifying the object pointer, is then stored in a selected location.

Advantageously, this does not require the handler to calculate the pointer address, thus improving performance. Further, it allows applications using objects in an area of memory not undergoing garbage collection to continue processing during garbage collection without interruption.

In one further embodiment, the selected portion of memory undergoing garbage collection is part of an object area that also includes one or more other objects not undergoing garbage collection, and advantageously, one or more applications accessing the object area not undergoing garbage collection continue process during garbage collection. For instance, they continue executing without interruption. Further, in one embodiment, the application that accessed the object pointer that indicates an object in the selected portion of memory undergoing garbage collection immediately resumes processing after a very brief delay during the time the handler (e.g., lightweight, application-level handler) processes the pointer. This enables applications to be used for time-sensitive processing because no application is delayed for a time period that is significant enough to be noticeable.

In one aspect, the obtaining the address of the object pointer from the pre-defined location includes reading the address from the pre-defined location, based on obtaining processing control. This advantageously eliminates the need for the handler to calculate the address; thus, saving instructions and time, and improving performance.

Additionally, one or more aspects may be used for other than garbage collection. For example, since one or more aspects described herein may be used to detect when a pointer to a specified storage address range is loaded, it may be used to provide an advance warning about imminent access into a restricted memory space. In this case, a memory region is initialized to be the restricted memory region. Subsequently, when a pointer is read that points to a restricted area, an EBB occurs. The EBB handler can then either prevent the access entirely, or provide an advance warning signal to a security monitor that an access is about to be made into a restricted area of memory or perform some other selected action. Other related applications are possible in situations in which there is a desire for an alert about an expected access that is about to be made to a specified memory area.

Figure 8:
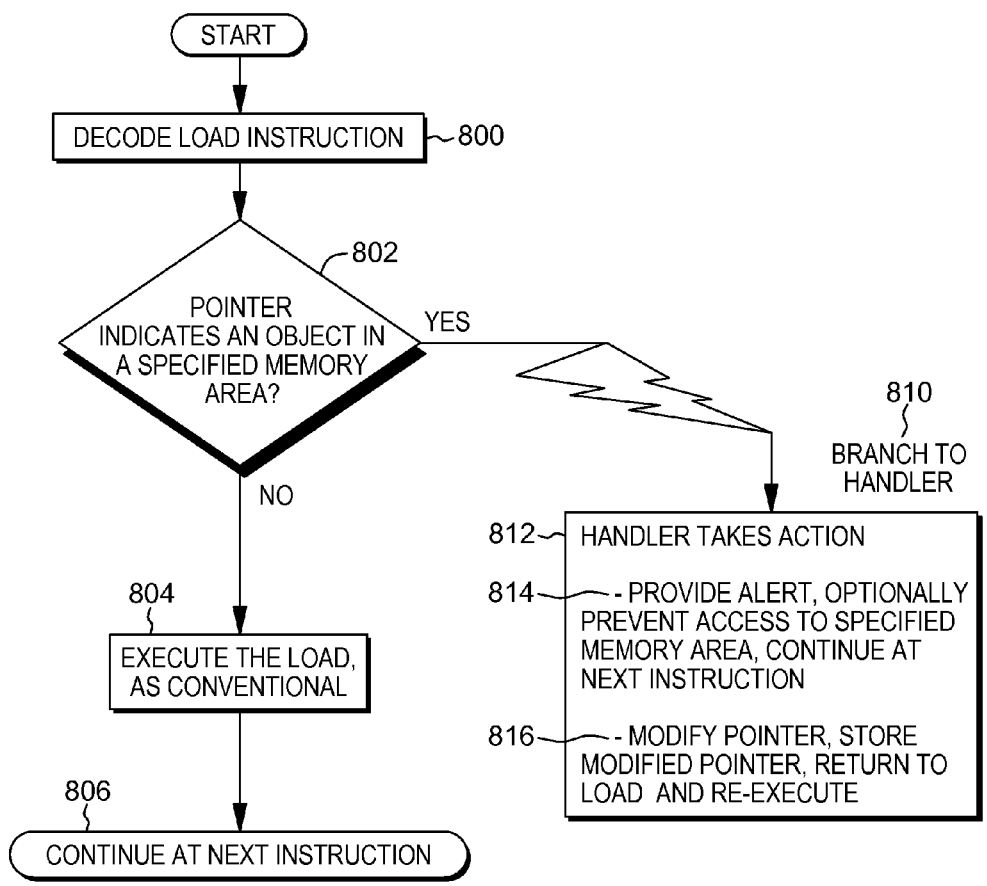
FIG. 8 depicts one embodiment of logic to take action by a handler based on a specified condition, in accordance with one or more aspects.

One embodiment of logic to take action by a handler based on a specific condition is described with reference to FIG. 8. In one example, a load instruction is decoded, STEP 800. (In another embodiment, it may be another type of instruction.) The load instruction may be one of various load instructions, including the ld instruction, the ldx instruction, the ldm or ldmx instruction, or another load instruction, as examples. The load instruction is decoded and based on the decoding, the object pointer is determined. A determination is made as to whether the object pointer indicates an object in a specified memory area, INQUIRY 802. This memory area is, for instance, a specified storage address range that is to be restricted for one reason or the other. If the pointer does not indicate an object in the specified memory area, then the load (or other instruction) is executed as conventional, STEP 804. Processing then continues at the next instruction, STEP 806.

However, returning to INQUIRY 802, if the pointer does indicate an object in a specified memory area, then control is obtained by a handler, STEP 810. For instance, the processor hardware performs an interrupt (e.g., a lightweight interrupt that does not involve the operating system) to the handler (e.g., an application-level handler). The handler may then take one or more actions, STEP 812. For instance, in one embodiment, the handler provides an alert, optionally prevents access to the specified memory area, and then continues processing at the next instruction, STEP 814. As a further example, the handler obtains the pointer address (e.g., from a predefined location or calculates it from the instruction), reads the pointer, modifies the pointer, stores the modified pointer back in the location from which it was read, and returns control to the instruction and re-executes the instruction, such that the specified memory area is not accessed, STEP 816. Other possibilities also exist.

As used herein, storage, central storage, main storage, memory and main memory are used interchangeably, unless otherwise noted, implicitly by usage or explicitly.

One or more aspects may relate to cloud computing.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Figure 9:
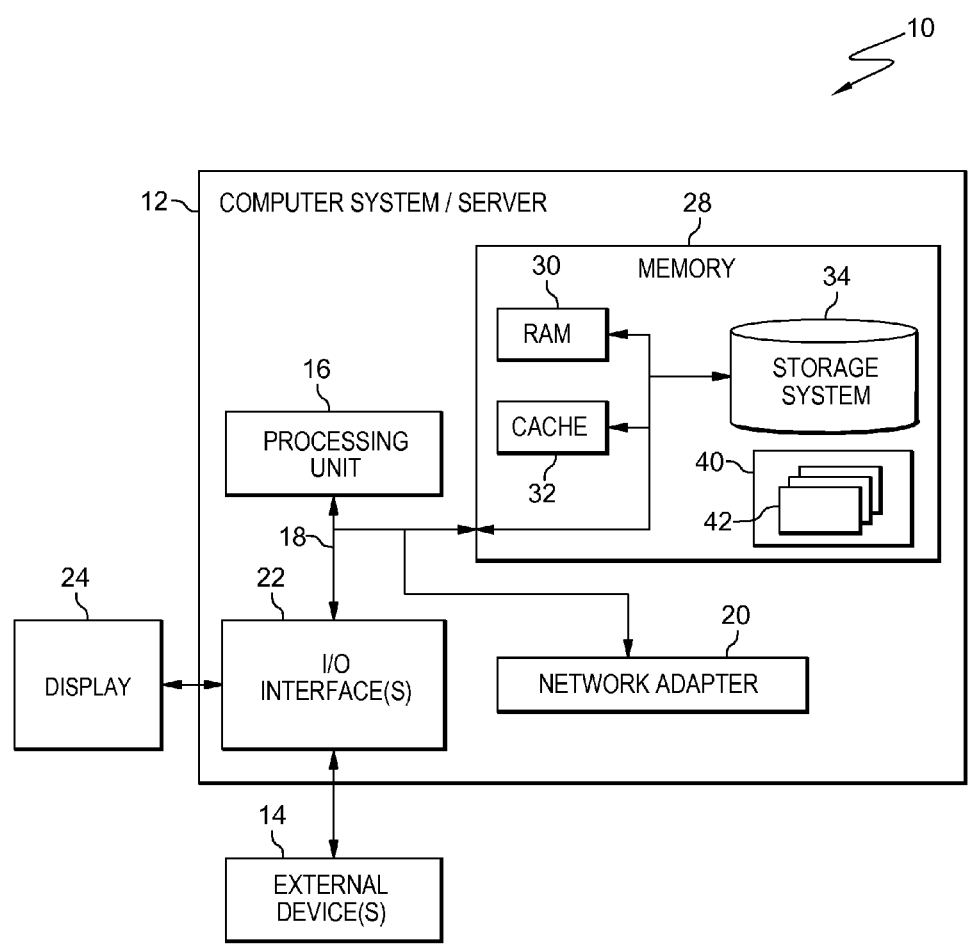
FIG. 9 depicts one example of a cloud computing node, in accordance with one or more aspects.

Referring now to FIG. 9, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 10:
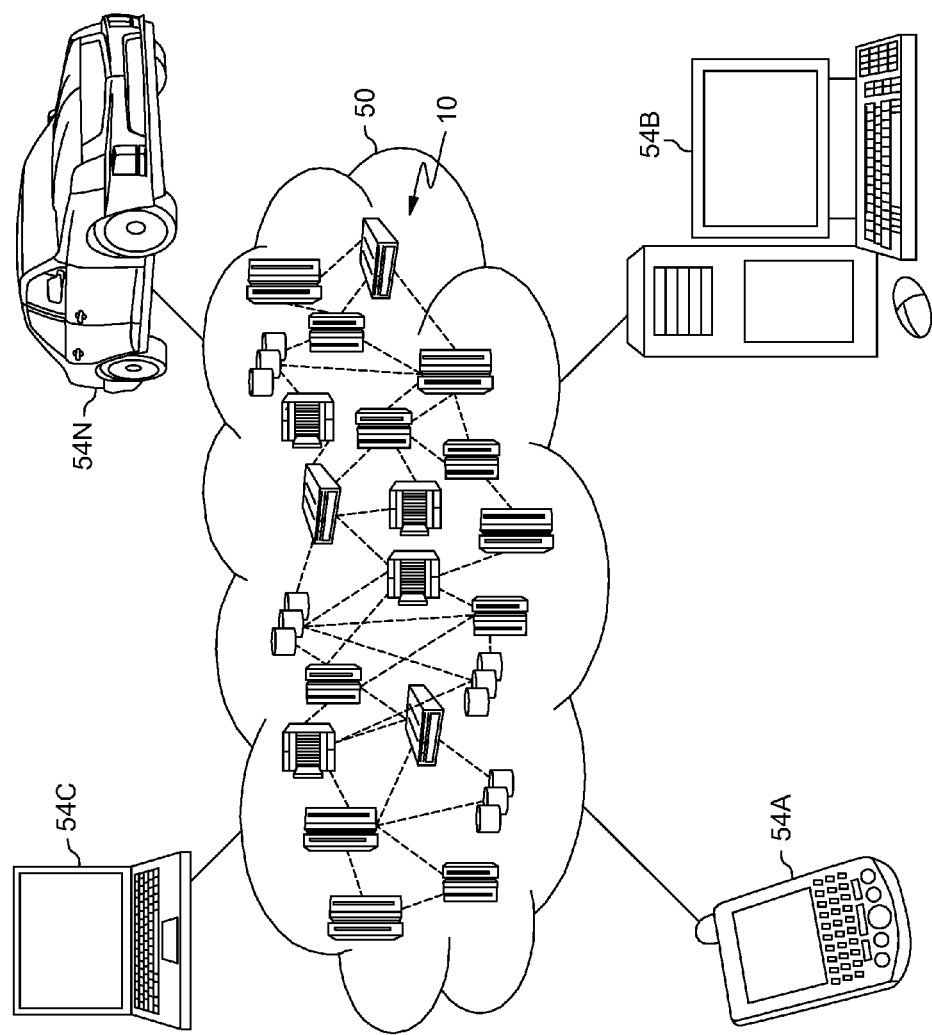
FIG. 10 depicts one embodiment of a cloud computing environment, in accordance with one or more aspects.

Referring now to FIG. 10, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Figure 11:
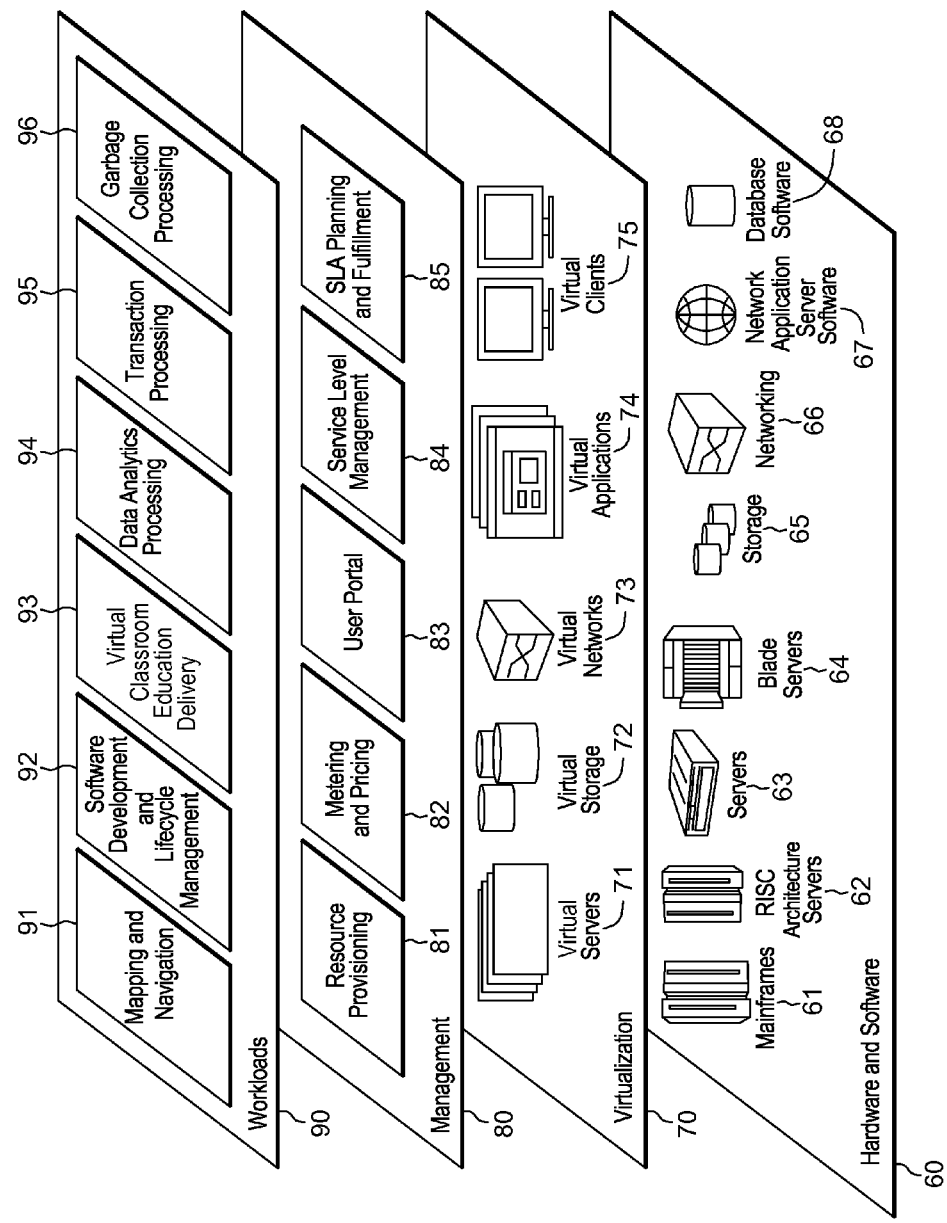
FIG. 11 depicts one example of abstraction model layers, in accordance with one or more aspects

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and garbage collection processing of one or more aspects of the present invention 96.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating garbage collection within a computing environment, said computer program product comprising:
a non-transitory computer readable storage medium readable by a processing circuit and storing instructions for execution by the processing circuit for performing a method comprising:
obtaining processing control by a handler executing within a processor of the computing environment, the obtaining processing control being based on execution of a load instruction and a determination that an object pointer to be loaded indicates a location within a selected portion of memory undergoing garbage collection;
based on obtaining processing control by the handler, obtaining by the handler from a pre-defined location an address of the object pointer, the address specifying a location of the object pointer;
based on obtaining the address of the object pointer, reading, by the handler, the object pointer, the object pointer indicating a location of an object pointed to by the object pointer;
determining by the handler whether the object pointer is to be modified;
modifying by the handler, based on determining the object pointer is to be modified, the object pointer to provide a modified object pointer; and
storing, based on modifying the object pointer, the modified object pointer in a selected location.

2. The computer program product of claim 1, wherein the selected location is a location specified by the pre-defined location or a location specified by the load instruction.

3. The computer program product of claim 1, wherein the obtaining processing control is via an interrupt issued by processor hardware, the interrupt issued based on execution of the load instruction and determination that the object pointer to be loaded indicates the location within the selected portion of memory undergoing garbage collection.

4. The computer program product of claim 1, wherein the selected portion of memory undergoing garbage collection is part of an object area that includes one or more other objects not undergoing garbage collection, and wherein one or more applications accessing the object area not undergoing garbage collection continues to process during garbage collection.

5. The computer program product of claim 1, wherein the method further comprises storing the address of the object pointer in the pre-defined location, the storing the address of the object pointer in the pre-defined location comprising:
determining from execution of the load instruction the object pointer;
comparing the object pointer with information relating to the selected portion of memory to determine that the object pointer indicates the location within the selected portion of memory; and
storing the address of the object pointer in the pre-defined location, based on determining the object pointer indicates the location within the selected portion of memory.

6. The computer program product of claim 1, wherein the obtaining the address of the object pointer from the pre-defined location comprises reading the address from the pre-defined location, based on obtaining processing control.

7. The computer program product of claim 1, wherein the pre-defined location comprises one of a location in memory or a register.

8. The computer program product of claim 1, wherein the selected portion of memory is indicated by one of a register or a location within memory.

9. The computer program product of claim 8, wherein the register includes a base address of the selected portion of memory and a size of the selected portion of memory.

10. The computer program product of claim 1, wherein the load instruction includes one or more operation code fields to specify a load operation, a result field to be used to obtain the object pointer, and one or more other fields to be used in the load operation.

11. A computer system for facilitating garbage collection within a computing environment, said computer system comprising:
a memory; and
a processor in communications with the memory, wherein the computer system is configured to perform a method, said method comprising:
obtaining processing control by a handler executing within the processor, the obtaining processing control being based on execution of a load instruction and a determination that an object pointer to be loaded indicates a location within a selected portion of memory undergoing garbage collection;
based on obtaining processing control by the handler, obtaining by the handler from a pre-defined location an address of the object pointer, the address specifying a location of the object pointer;
based on obtaining the address of the object pointer, reading, by the handler, the object pointer, the object pointer indicating a location of an object pointed to by the object pointer;
determining by the handler whether the object pointer is to be modified;
modifying by the handler, based on determining the object pointer is to be modified, the object pointer to provide a modified object pointer; and
storing, based on modifying the object pointer, the modified object pointer in a selected location.

12. The computer system of claim 11, wherein the obtaining processing control is via an interrupt issued by processor hardware, the interrupt issued based on execution of the load instruction and determination that the object pointer to be loaded indicates the location within the selected portion of memory undergoing garbage collection.

13. The computer system of claim 11, wherein the selected portion of memory undergoing garbage collection is part of an object area that includes one or more other objects not undergoing garbage collection, and wherein one or more applications accessing the object area not undergoing garbage collection continues to process during garbage collection.

14. The computer system of claim 11, wherein the method further comprises storing the address of the object pointer in the pre-defined location, the storing the address of the object pointer in the pre-defined location comprising:
- determining from execution of the load instruction the object pointer;
- comparing the object pointer with information relating to the selected portion of memory to determine that the object pointer indicates the location within the selected portion of memory; and
- storing the address of the object pointer in the pre-defined location, based on determining the object pointer indicates the location within the selected portion of memory.

15. The computer system of claim 11, wherein the selected location is a location specified by the pre-defined location or a location specified by the load instruction.

16. The computer system of claim 11, wherein the obtaining the address of the object pointer from the pre-defined location comprises reading the address from the pre-defined location, based on obtaining processing control.

17. The computer system of claim 11, wherein the pre-defined location comprises one of a location in memory or a register.

18. The computer system of claim 11, wherein the selected portion of memory is indicated by one of a register or a location within memory.

19. The computer system of claim 18, wherein the register includes a base address of the selected portion of memory and a size of the selected portion of memory.

20. The computer system of claim 11, wherein the load instruction includes one or more operation code fields to specify a load operation, a result field to be used to obtain the object pointer, and one or more other fields to be used in the load operation.

* * * * *